US 6,655,806 B2

(12) United States Patent
Chen

(10) Patent No.: US 6,655,806 B2
(45) Date of Patent: Dec. 2, 2003

(54) AUTOMOTIVE OPTICAL LENS SUN SHIELD

(75) Inventor: Peter Chen, Taipei (TW)

(73) Assignee: Marigen Company Ltd., Taipei (TW)

( * ) Notice: Subject to any disclaimer, the term of this patent is extended or adjusted under 35 U.S.C. 154(b) by 36 days.

(21) Appl. No.: 09/988,832

(22) Filed: Nov. 20, 2001

(65) Prior Publication Data

US 2003/0095333 A1 May 22, 2003

(51) Int. Cl.⁷ .......................... G02B 17/00; G02B 7/182
(52) U.S. Cl. ...................... 359/608; 359/601; 359/871
(58) Field of Search ................................ 359/601–613, 359/838–839, 821, 829, 884; 296/97.11–97.13, 97.6–97.9

(56) References Cited

U.S. PATENT DOCUMENTS 2,639,641 A * 5/1953 Piwczynski et al. ........ 359/608
4,090,732 A * 5/1978 Vistitsky ..................... 296/97.6
4,982,992 A * 1/1991 Vu et al. ..................... 296/97.6
5,873,620 A * 2/1999 Lu .............................. 296/97.5
6,309,004 B1 * 10/2001 McNutt et al. ............. 296/97.6

* cited by examiner

Primary Examiner—Thong Nguyen

(57) ABSTRACT

An automatic optical lens sun shield comprises an elastic clip cartridge, a rotary connector and a tinted transparent optical lens screen. The elastic clip cartridge is constructed with spring clamp frames which can be pulled outward and clipped on an original padded visor as well as detached from the original padded visor without using any hand tool. The rotary connector is constructed with a positioning pivot shaft which drives the positioning pad to rotate. Thereby, the radiating teeth at the bottom of the positioning pad is engaged to the radiating positioning teeth of the rotating connector. Therefore, the rotary connector can rotate under the clip cartridge and is securely positioned thereon. The lower part of the rotary connector is formed with at least one pivot groove. The tinted transparent optical lens screen is engaged to the pivot groove via a rotary shaft.

2 Claims, 4 Drawing Sheets

AUTOMOTIVE OPTICAL LENS SUN SHIELD

FIELD OF THE INVENTION

The present invention relates to a sun shield, and particularly a tinted optical lens sun shield, wherein the orientation of the sun shield can be rotated and adjusted.

BACKGROUND OF THE INVENTION

Traditionally, an original padded visor installed above the auto driver's seat can be pulled down to prevent sun glare from irritating driver's eyes. However, since the padded visor is non-transparent, it also obstructs frontal views and thus induces driving accidents. Therefore, a device to solve the dilemma and to promote both driving comfort and driving safety is necessary.

SUMMARY OF THE INVENTION

Accordingly, the primary object of the present invention is to provide a transparent sun shield comprising an elastic clip cartridge, a rotary connector and a tinted transparent optical lens screen. The elastic clip cartridge is constructed with spring clamp frames which can be pulled outward and clipped on original padded visor as well as detached from the original padded visor without using any hand tool. The rotary connector is constructed with a positioning pivot shaft which drives the positioning pad to rotate. Thereby, the radiating teeth at the bottom of the positioning pad is engaged to the radiating positioning teeth of the rotating connector. Therefore, the rotary connector can rotate under the clip cartridge and is securely positioned thereon. The lower part of the rotary connector is formed with at least one pivot groove. The tinted transparent optical lens screen is engaged to the pivot groove via a rotary shaft. Therefore, the lens screen can be flipped or swiveled for shielding both eyes and face from sun glare and UV (ultraviolet ray) as well as for preventing the image of the driver from being projected on the lens screen.

As a result, the panoramic and tinted transparent lens screen not only shields both eyes and face against harmful sun glare and ultraviolet rays (UV rays) but also provides unobstructed frontal views. No more burdensome sunglasses or heavy sunblock lotion, greatly enhances comfort, safety and health for the driver and the front seat passenger.

Various objects and advantages of the present invention will be more comprehended from following detailed description when read in conjunction with the appended drawings.

DETAILED DESCRIPTION OF THE PREFERRED EMBODIMENTS

Figure 1:
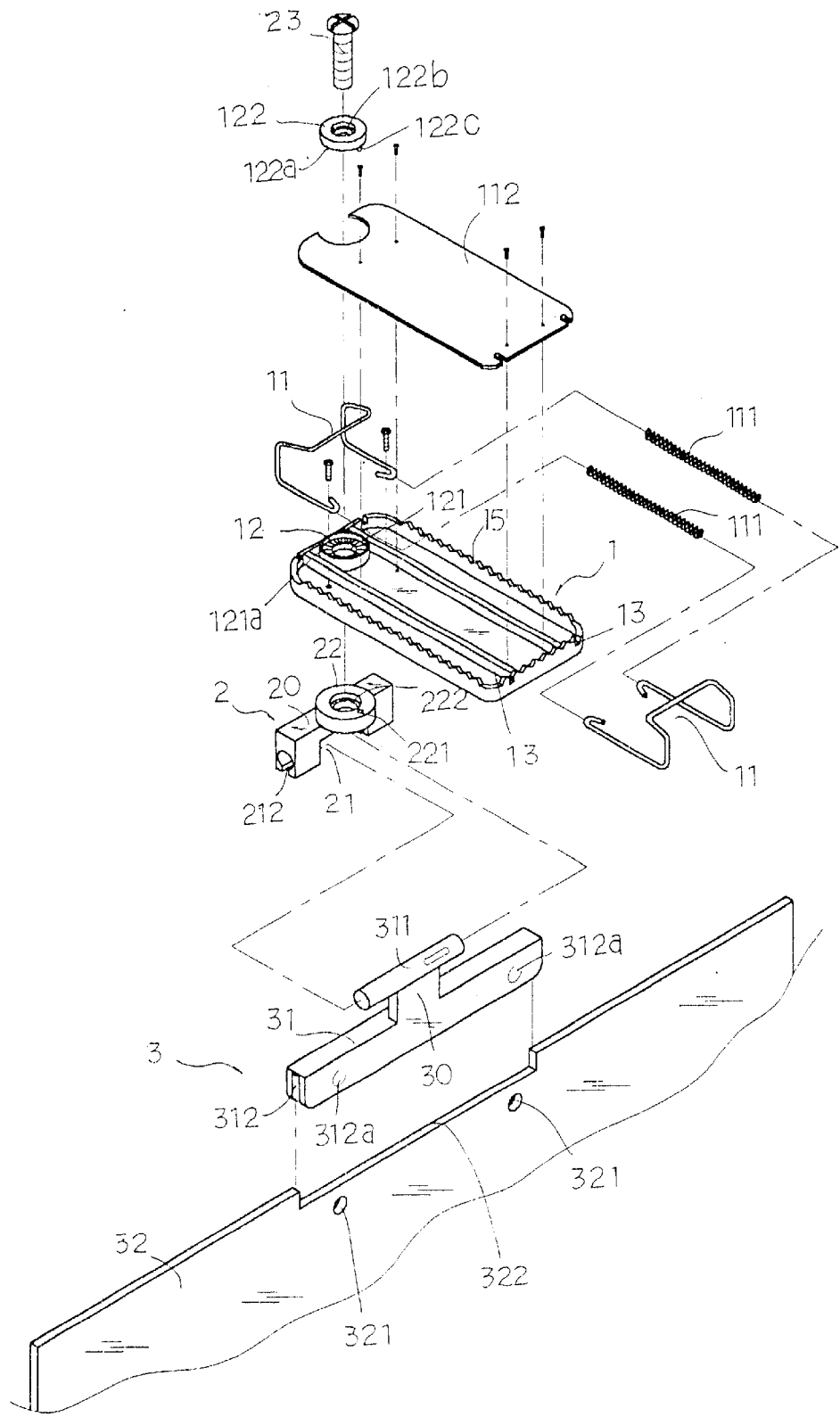
FIG. 1 is an exploded view of the present invention.

Referring to FIGS. 1 to 4, the automotive optical lens sun shield of the present invention is illustrated.

The automotive optical lens sun shield of the present invention includes an elastic clip cartridge 1, a rotary connector 2 and a tinted transparent optical lens screen 3. Two sides of the clip cartridge 1 are protruded with a plurality of teeth 15 for tightly clamping the cover plate 112. At the corresponding positions of two sides of the clip cartridge 1 are installed with a set of elastic clamp frames 11 for pulling and clipping on two ends of the original padded visor. The top end of the rotary connector 2 is protruded upwards with a positioning pivot shaft 22, thereby, being pivotally installed to the clip cartridge 1. Thus, the rotary connector 2 is rotatable under the clip cartridge 1 and is positioned thereon steadily. The lower part of the rotary connector 2 is formed with at least one pivot groove 21. The tinted transparent optical lens screen 3 may be pivotally embedded into the pivot groove 21 of the rotary connector 2. Therefore, the user may selectively flip or swivel the lens screen 3 under the rotary connector 2 so as to shield face and eyes from harmful sun glare and to prevent the image of the driver from being projected to the lens screen, and therefore, driving comfort and safety is improved greatly.

Figure 2:
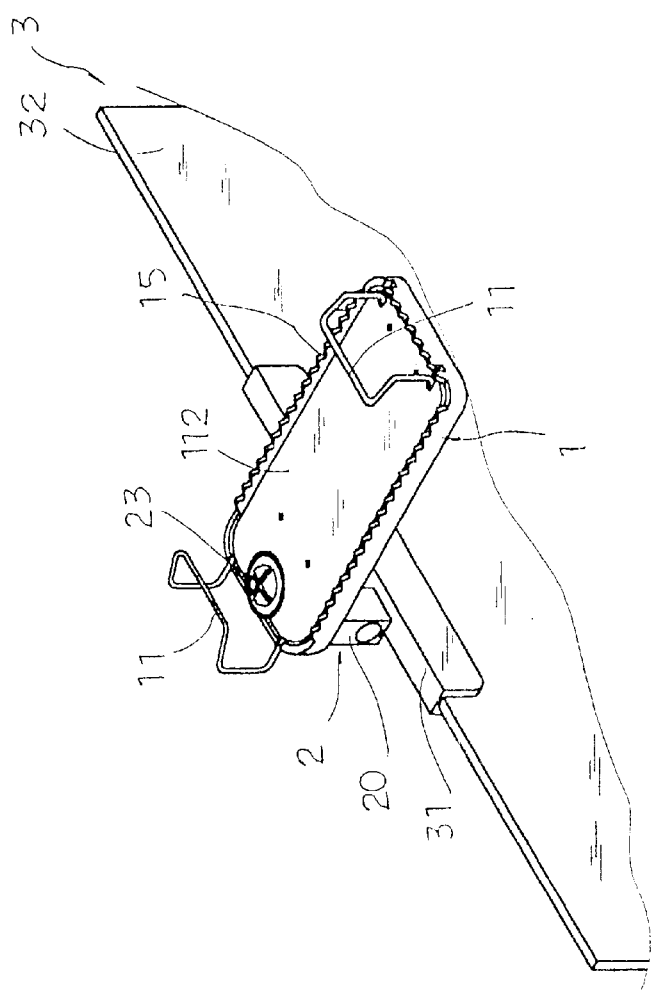
FIG. 2 is an assembled view of the present invention.
Figure 3:
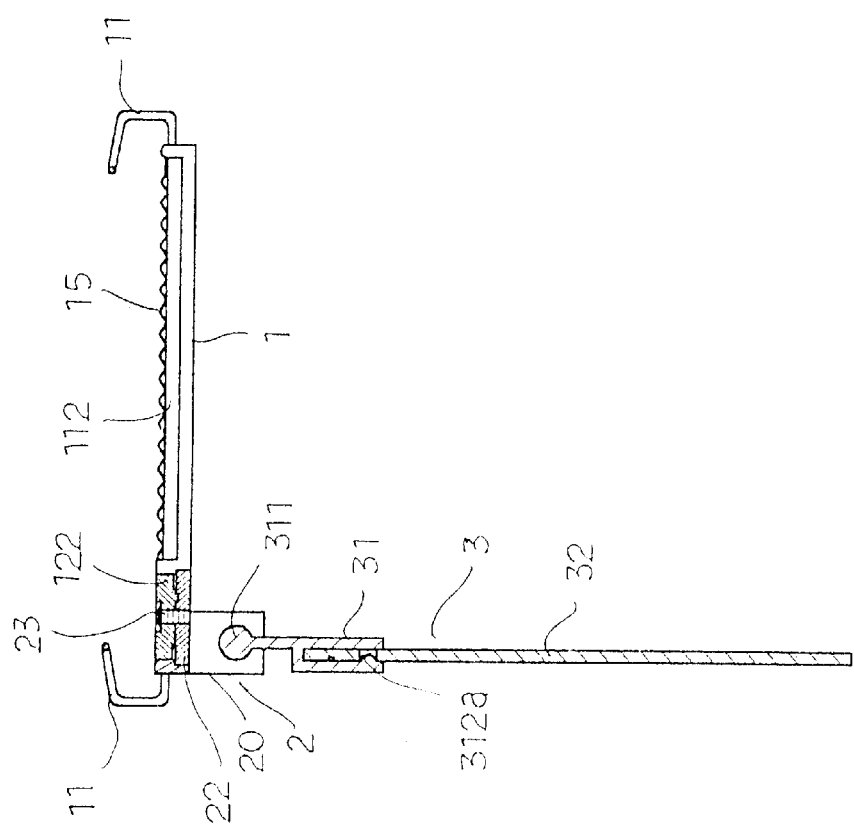
FIG. 3 is a cross sectional view of the present invention.

Referring to FIGS. 1, 2 and 3, the clip cartridge 1 passes through an axial hole 12 guided by two transversal strips 13 and is engaged with the positioning pivot shaft 22 of the rotary connector 2. The top section of the axial hole 12 is formed with a recess 121 for receiving a positioning pad 122 therein. The lower end of the recess 121 is formed with a plurality of positioning teeth 121a for being engaged with the radiated teeth 122a at the lower end of the positioning pad 122. At center of the pad was a through hole 122b for being passed by a screw 23 and is locked to the positioning pivot shaft 22 of the rotary connector 2.

One end of the clamp frame 11 protrudes and stays at the connecting end of the clip cartridge 1, and another end thereof is embedded into the cabin of the clip cartridge 1 and is positioned by an elastic element 111. The elastic element 111 can be pulled outward gradually to suit various widths of original padded visor. Furthermore, the top thereof is covered by a cover plate 112. Thereby, the attachment and detachment of the clip cartridge on and from the original padded visor are very easy. Moreover, since a set of elastic clamp frames 11 at two sides of the clip cartridge 1 are matched with one another, they can smoothly and firmly clip on the original padded visor.

The rotary connector 2 contains a seat 20. A lower end of the seat 20 is formed with a positioning groove 21. The middle section of the positioning groove 21 is formed with at least one via hole 212 at one side thereof for receiving the lens screen 3. A positioning pivot shaft 22 radially protrudes from the upper surface with the seat 20. The top of the positioning pivot shaft 22 is installed with a cavity 221 for receiving a pin 122c of the positioning pad 122, thereby, the rotary connector 2 may co-drive the positioning pad 122 to rotate together. The top center of the positioning pivot shaft 22 is installed with a threaded hole 222 for screwing a screw 23 so as to be pivotally installed in the axial hole 12 of the clip cartridge 1 steadily.

The lens screen 3 contains a connecting plate 31. A rotary shaft 311 is transversally formed at a top of the connecting plate 31 for being connected to the positioning groove 21 of the rotary connector 2. The lower end of the connecting plate 31 is formed with a slot 312. A positioning projection 312a and a lens screen portion 32 are formed on at least one wall of the slot 312. At least one positioning hole 321 penetrates through the lens screen portion 32 so as to buckle the lens screen portion 32 to a lower end of the connecting plate 31. Therefore, the lens screen 3 is able to rotate together with the connecting plate 31 synchronously.

The width of the middle section 30 of the connecting plate 31 is smaller than the width of the via hole 212 at the middle section of the positioning groove 21. Thereby, the lens screen 3 may be moved toward the via hole 212.

The top of the lens screen 3 has a concave portion 322. The width of the concave portion 322 is equal to the width of the connecting plate 31 between the two slots 312. In assembly, the lens screen portion 32 can be adjusted and guided to engage the slots 312. Thereby, positioning holes 321 of the lens screen portion 32 are aligned to the positioning projection 312a in the slots 312.

As adjusting the rotary connector 2, the positioning pivot shaft 22 can drive the positioning pad 122 to rotate therewith, so that the teeth 122a at the lower side of the positioning pad 122 are engaged with the positioning teeth 121a of the axial hole 12 of the clip cartridge 1. Thereby, the rotary connector 2 may also drive the lens screen portion 32 to shift steadily and synchronously. Furthermore, the top end of the lens screen portion 32 is embedded to the slots 312 of the connecting plate 31. Thereby, they are engaged more securely.

In this tinted optical lens sun shield of the present invention, the lens screen portion 32 of the sun shield 3 is formed with tinted optical lens generally applied in sunglasses having the same or different sunlight isolation coefficient. Therefore, when the car moves in daytime, the lens sun screen 3 can be gradually pulled down, flip, swivel and rotate for optimal effects. The optical lens screen 3 of the present invention is versatile for different daytime driving environments so as to promote driving comfort and safety.

Figure 4:
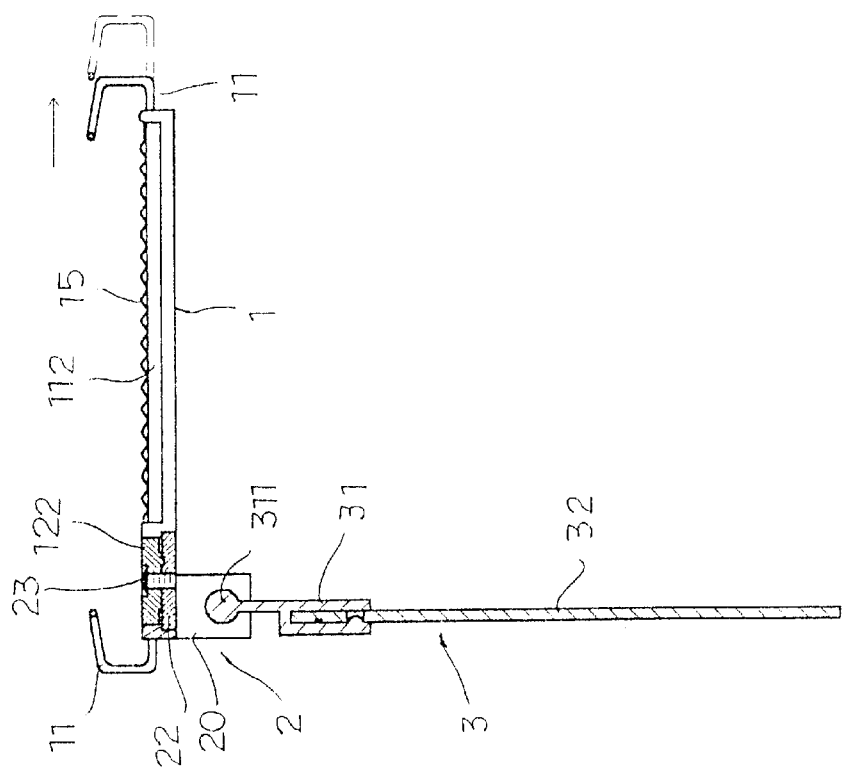
FIG. 4 is an operational schematic view of the present invention.

Referring to FIG. 4, it shows that the elastic clamping frame is pulled out with respect to the clip cartridge 1.

Therefore, from above description, it is apparent that the present invention has the following advantages:

1. The present invention has a simple structure and can be firmly secured, and easily attached and detached without using hand tool.
2. In installation, it is only necessary to simply pull and clip the elastic clamp frames on to the original padded visor, no alteration to the automotive interior.
3. The orientation of the lens screen can be adjusted to shield sunlight from different angles in daytime or even strong opposite beam at night as well as to prevent the image of the driver from being projected to the transparent lens screen. Therefore, both driving safety and comfort are enhanced. Furthermore, both driver's eyes and face are shielded against harmful sun glare and UV. Conventional sunglasses shield eyes only. Original padded visor obstructed frontal views. This present invention finally solves the dilemma.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An automatic optical lens sun shield, comprising:

an elastic clip cartridge being installed with a set of spring clamp frames at two sides thereof for pulling and clipping two ends of an original padded visor; one end of each clamp frame protruding and staying at a connecting end of the clip cartridge and another end thereof being embedded into a cabin of the clip cartridge and being positioned by an elastic element; said elastic element being pulled outward gradually to suit for various widths of said original padded visor; furthermore, a top thereof being covered by a cover plate; wherein attachment and detachment of said clip cartridge on and from said original padded visor are very easy; moreover, since the set of elastic clamp frames at two sides of the clip cartridge are matched with one another, they smoothly and firmly clip said original padded visor; and thus, said elastic clamp frames are capable of being pulled outward and clipped said original padded visor as well as being detached from said original padded visor without using any hand tool;

a rotary connector including a positioning pivot shaft; said positioning pivot shaft being engaged to a positioning pad so that the positioning pivot shaft can drive said positioning pad to rotate; said rotating connector having a plurality of radiating positioning teeth, and said positioning pad having a plurality of teeth; thereby, said radiating teeth at a bottom of a positioning pad being engaged to said radiating positioning teeth of said rotating connector; thus, said rotary connector rotating under said clip cartridge and being securely positioned thereon; and a lower part of said rotary connector being formed with at least one pivot groove; and a tinted transparent optical lens screen being engaged to said pivot groove via a rotary shaft.

2. The automatic optical lens sun shield as claimed in claim 1, wherein two sides of said clip cartridge has a plurality of teeth for tightly clamping said cover plate.

* * * * *